(12) United States Patent
Hsu et al.

(10) Patent No.: US 7,099,870 B2
(45) Date of Patent: Aug. 29, 2006

(54) PERSONALIZED WEB PAGE

(75) Inventors: Wen-Lian Hsu, Taipei (TW); Yi-Shiou Chen, Taipei (TW)

(73) Assignee: Academia Sinica, Taipei (TW)

( * ) Notice: Subject to any disclaimer, the term of this patent is extended or adjusted under 35 U.S.C. 154(b) by 214 days.

(21) Appl. No.: 10/045,616

(22) Filed: Nov. 9, 2001

(65) Prior Publication Data

US 2003/0093427 A1 May 15, 2003

(51) Int. Cl.
- *G06F 7/00* (2006.01)
- *G06F 17/30* (2006.01)
- *G06F 17/00* (2006.01)
- *G06F 12/00* (2006.01)
- *G06F 15/173* (2006.01)

(52) U.S. Cl. .................. 707/10; 707/100; 707/200; 709/223; 709/224; 709/226

(58) Field of Classification Search .............. 707/1, 707/6, 10, 100, 200; 709/200, 223–229; 715/501.1, 513, 517
See application file for complete search history.

(56) References Cited

U.S. PATENT DOCUMENTS

| | | | | |
|---|---|---|---|---|
| 5,983,227 | A * | 11/1999 | Nazem et al. ........... | 707/10 |
| 6,006,218 | A * | 12/1999 | Breese et al. ........... | 707/3 |
| 6,424,981 | B1 * | 7/2002 | Isaac et al. ........... | 715/513 |
| 6,460,038 | B1 * | 10/2002 | Khan et al. ........... | 707/10 |
| 2002/0065681 | A1 * | 5/2002 | Fenson et al. ........... | 705/1 |
| 2002/0065877 | A1 * | 5/2002 | Kowtko et al. ........... | 709/203 |
| 2002/0091721 | A1 * | 7/2002 | Mcbride et al. ........... | 707/203 |
| 2002/0099602 | A1 * | 7/2002 | Moskowitz et al. ........... | 705/14 |
| 2002/0188503 | A1 * | 12/2002 | Banerjee et al. ........... | 705/14 |
| 2003/0046311 | A1 * | 3/2003 | Baidya et al. ........... | 707/200 |
| 2004/0153508 | A1 * | 8/2004 | Alcorn et al. ........... | 709/205 |

OTHER PUBLICATIONS

BabyCenter LIVE, 'http://www.babycenter.com/rss/', pp. 1-4.*
MyYahoo! Rss Add Page, pp. 1-4.*
Freire et al., 'Webviews: accessing personalized web content and services', May 1-5, 2001, ACM, pp. 576-586.*
Anderson et al, 'Personalizing websites for mobile users', May 1-5, 2001, ACM, pp. 565-575.*
H. L. Wang et al. "Semantic Search on Internet Tabular Information Extraction for Answering Queries," Proceedings of the Ninth International Conference on Information and Knowledge Management, 2000, 7 pages.
T. Mitchell, "Machine Learning," Chapter 6: Bayesian Learning, pp. 154-184, McGraw Hill, 1997.
Gusfield, "Algorithms on Strings, Trees, and Sequences," Chapter 11: Core String Edits, Alignments, and Dynamic Programming, pp. 215-227, Cambridge University Press, 1997.
Hsu et al., "Event Identification Based on the Information Map—Infomap," Proceedings of the 2001 IEEE Systems, Man, and Cybernetics Conference, Oct. 2001, 6 pages.
Chen et al., "Personal Browser," Proceedings of the 21st Annual International ACM SIGIR Conference on Research and Development in Information Retrieval, 1998, 2 pages.

* cited by examiner

*Primary Examiner*—Uyen Le
*Assistant Examiner*—Cheryl M Shechtman
(74) *Attorney, Agent, or Firm*—Fish & Richardson P.C.

(57) ABSTRACT

Updating a personalized web page by identifying characteristic features and an information sample from an input, in which the input specifies a web site that provides the information sample. When an update is required by a user-specified frequency, corresponding contents of the web site are determined based on the characteristic features. If the corresponding contents are highly relevant to the information sample, the corresponding contents are extracted, and the personalized web page is updated with the corresponding contents.

27 Claims, 6 Drawing Sheets

<Example 2.1>

21 — URL: http://www-3.ibm.com/e-business/glossary/

22 — Update frequency: every month

23 — User's annotation: The meaning of ASP

Information object:

25 — Application Service Provider

26 — A company that offers subscription services for applications and related services on a pay-per-use basis. ASPs host, manage and maintain applications at their own site and make them available via the Web. This enables smaller companies or those with limited budgets to take full advantage of the latest information technology.

<Example 2.2>

21b — URL: http://www.cnn.com/

22b — Update frequency: every weekday

23b — User's annotation: The top stories of CNN's top page

Information object:

25b — TOP STORIES

26b —
- 62-year-old woman gives birth
- Mutombo helps lift Sixers to Game 5 win | In-Depth
- Wahid defiant in face of impeachment | In-Depth
- Erekat blasts Israel settlements | In-Depth
- Deputies wait out armed children in Idaho
- Downey to plead no contest to drug charges, get rehab — 24b

FIG. 2B

<Example 2.3>

21c — URL: http://www.cnn.com/WEATHER/as/Taiwan/TaipeiTAIX.html

22c — Update frequency: every day

23c — User's annotation: Weather forecast of Taipei, Taiwan
Information object:

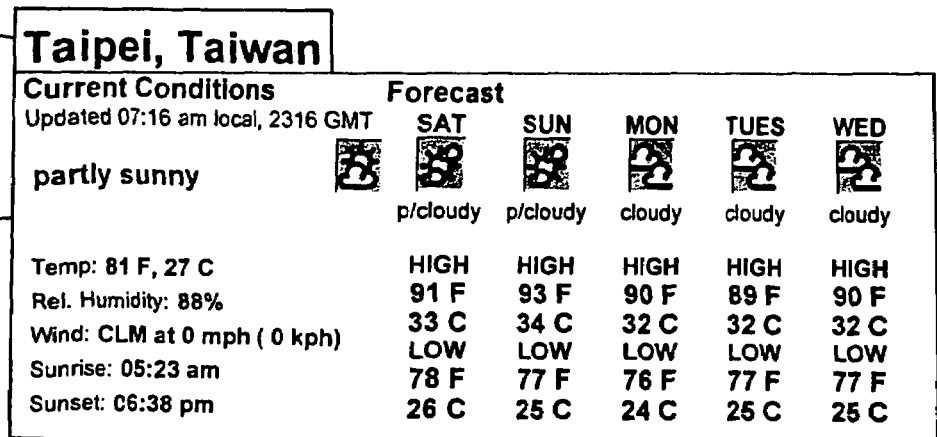

FIG. 2C

<Example 2.4>

21d — URL: http://activequote100.fidelity.com/nav/select.phtml

22d — Update frequency: every weekday

23d — User's annotation: Daily price of Biotechnology
Information object:

26d — Biotechnology    42    FBIOX    67.47   — 24d

User's annotation: Daily price of Electronics
Information object:
Electronics    8    FSELX    51.43

User's annotation: Daily price of Technology
Information object:
Technology    64    FSPTX    68.80

FIG. 2D

PERSONALIZED WEB PAGE

TECHNICAL FIELD

This invention relates to techniques for updating a personalized web page.

BACKGROUND

Web browsers allow users to reach web sites across the Internet to view web pages. When a user finds a web page of interest, he can mark the page with a "bookmark", which records a Universal Resource Locator (URL) of the web site providing that web page. Many of the current web browsers, such as Internet Explorer and Netscape Communicator, supply a book-marking tool for users to record the URLs of interest. When a user wants to revisit a web page that has been marked with a bookmark, he can enable the bookmark, e.g., by clicking on the bookmark with a mouse, to reach the web page.

However, these currently available book-marking tools only allow a user to visit a web page each time he selects a corresponding bookmark.

Some web sites, e.g., Yahoo, provide utilities that allow users to customize a web page by selecting certain topics of interest. However, the users can only select topics from a collection of pre-compiled topics. The utilities do not allow the users to select topics outside of the collection.

SUMMARY

In one aspect of the invention, the invention relates to a method of updating a personalized web page. The method includes: identifying characteristic features and an information sample from an input; determining corresponding contents of the web site based on the characteristic features; extracting the corresponding contents on the basis of relevancy of the corresponding contents to the information sample; and updating the personalized web page with the corresponding contents. In the input, a web site that provides the information sample is specified.

Embodiments of this aspect of the invention may include one or more of the following features. The input also specifies a frequency at which the steps of determining, extracting, and updating are repeated. In certain embodiments of this aspect of the invention, the method also includes: requesting a verification after updating the personalized web page; if the verification confirms the update, adding the corresponding contents into a training set; and locating the corresponding contents of the web site based on the training set in the repeating steps. Identifying the characteristic features include: identifying a topic keyword; a layout; a domain keyword; a semantic category; and an event.

In certain embodiments of this aspect of the invention, the method further includes: assigning a score according to degree of relevancy of the corresponding contents to the information sample; and requesting a different input if the score is below a pre-determined threshold.

In another aspect of the invention, the invention relates to a system for updating a personalized web page. The system includes: a processor, which is connected to a plurality of web sites by a network; and a display, which displays the personalized web page. The processor is adapted to: identify characteristic features and an information sample from an input, the input specifying a web site among the plurality of web sites, the specified web site providing the information sample; determine corresponding contents of the web site based on the characteristic features; extract the corresponding contents on the basis of relevancy of the corresponding contents to the information sample; and update the personalized web page with the corresponding contents.

Embodiments of this aspect of the invention may include one or more of the following features. The processor is adapted to repeatedly identify, determine, and update at a frequency specified by the input. the processor is also adapted to: request a verification after updating the personalized web page; if the verification confirms the update, add the corresponding contents into a training set; and locate the corresponding contents of the web site based on the training set in the repeating steps.

In certain embodiments of this aspect of the invention, the system further includes a topic database for the processor to identify one of the characteristic features as a topic keyword. The system also includes a layout analyzer for the processor to identify one of the characteristic features as a layout. The system also includes: an online domain database for the processor to identify one of the characteristic features as a domain keyword; a semantic tree for the processor to identify one of the characteristic features as a semantic category; and an event database for the processor to identify one of the characteristic features as an event.

In certain embodiments of this aspect of the invention, the processor is further adapted to: assign a score according to degree of relevancy of the corresponding contents to the information sample, the score indicating the degree of relevancy of the corresponding contents to the information sample; and request a different input if the score is below a pre-determined threshold.

In still another aspect of the invention, a computer program product residing on a computer readable medium comprising instructions for causing a computer to: identify characteristic features and an information sample from an input that specifies a web site, the web site providing the information sample; determine corresponding contents of the web site based on the characteristic features; extract the corresponding contents on the basis of relevancy of the corresponding contents to the information sample; and update the personalized web page with the corresponding contents.

Embodiments of this aspect of the invention may include one or more of the following features. The computer program product also includes instructions for causing the computer to repeatedly identify, determine, and update at a frequency specified by the input. The computer program product further includes instructions for causing the computer to: request a verification after updating the personalized web page; if the verification confirms the update, add the corresponding contents into a training set; and locate the corresponding contents of the web site based on the training set in the repeating steps. The characteristic features include a topic keyword, a layout, a domain keyword, a semantic category, and an event.

In certain embodiments of this aspect of the invention, the computer program product also includes instructions for causing the computer to: assign a score according to degree of relevancy of the corresponding contents to the information sample; and request a different input if the score is below a pre-determined threshold. Assigning the score includes: comparing the topic keyword and the layout of the corresponding contents with those of the information sample to determine the degree of relevancy. Assigning the score also includes: comparing the domain keyword, the semantic category, the event, and the layout of the corresponding contents with those of the information sample to determine the degree of relevancy.

Embodiments may have one or more of the following advantages. With these aspects of the invention, a user can combine any portion of web pages from any web site to form a personalized web page efficiently and effectively. The web page can be displayed in a single browser window on a client machine, allowing the user to easily locate information of interest provided by different web sites. The method, system, and the computer product are adaptive to the ever-changing design of web sites. WebScript may adopt the XML format, and the user's annotation may be recorded in XML files.

Other features, objects, and advantages of the invention will be apparent from the description and drawings, and from the claims.

DESCRIPTION OF DRAWINGS

FIGS. 2A–2D includes four examples of user inputs for the WebScript transcribed system;

Like reference symbols in the various drawings indicate like elements.

DETAILED DESCRIPTION

Figure 1:
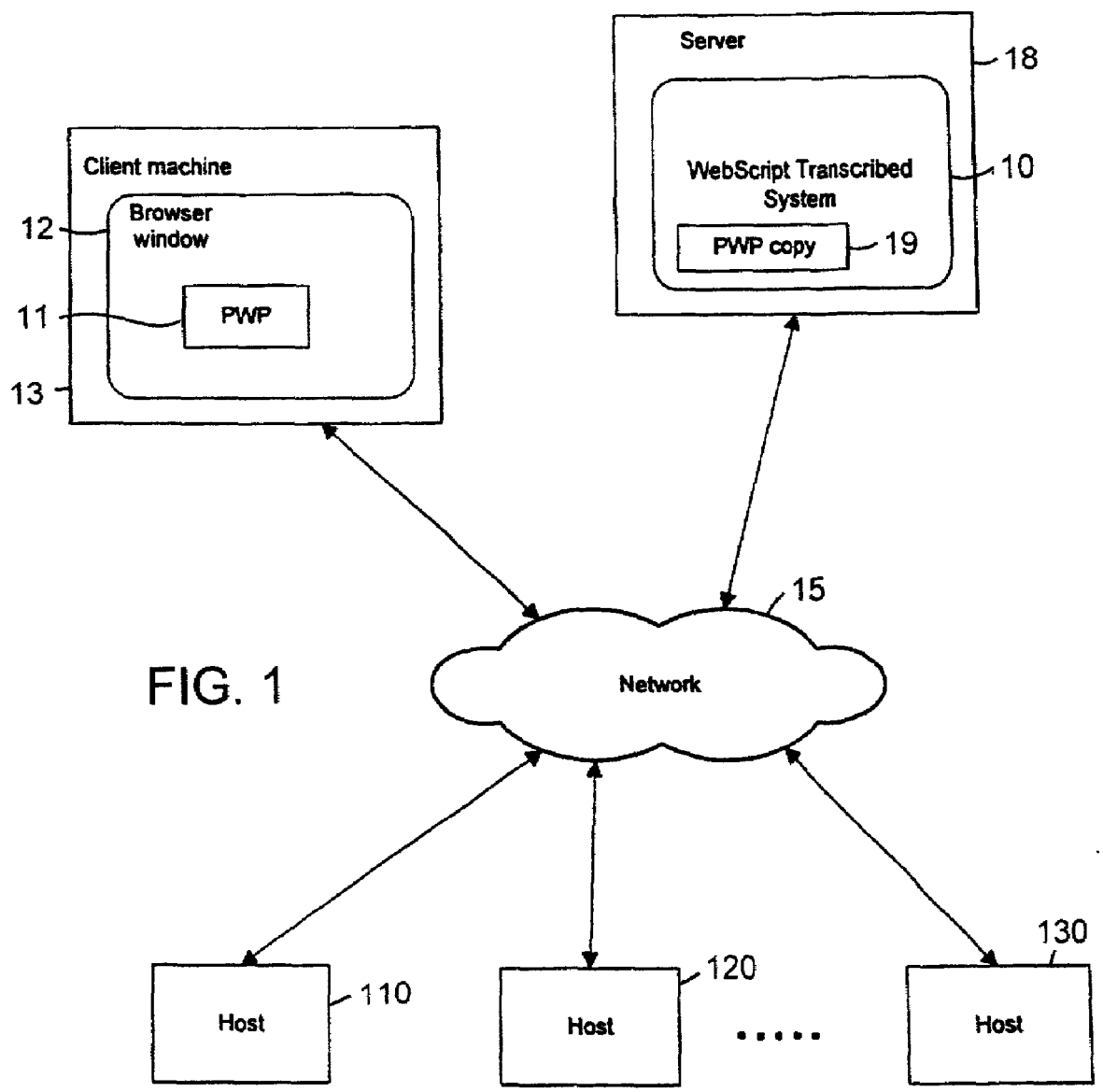
FIG. 1 is an example of a WebScript transcribed system that communicates with web sites over the Internet.

Referring to FIG. 1, a WebScript transcribed system 10, residing on a server 18, is connected to hosts 110, 120, and 130 (only three are shown) over network 15 (e.g., the Internet). Each of the hosts 110, 120, and 130 houses at least one web site that provides web pages for access by a client machine 13. When a user at client machine 13 sends a request or an input to system 10, system 10 produces a Personalized Web Page (PWP) 11 that can be displayed in a browser window 12 on client machine 13. Based on the input received by system 10, PWP 11 will include the specified contents of the web pages that are provided by the specified web sites. System 10 also updates the specified contents to reflect changes in the web pages.

A copy 19 of PWP 11 is stored in system 10 for later updates. If security or privacy of the content of PWP 11 is important, PWP copy 19 can be protected with passwords to restrict the access. Alternatively, system 10 and PWP copy 19 can reside on client machine 13 instead of on server 18 as shown in FIG. 1. If system 10 resides on client machine 13, input received from a user can be received and processed locally.

The input is in a computer-readable script language called WebScript, which is a script program written in a format recognized by the Web, such as HTML and XML. WebScript can be interpreted and executed by system 10. A user can specify, in the input, the URLs of web sites and particular information topics that are of interest to the user. The web sites and information topics are not restricted to a predetermined collection of web sites and topics. Any web sites and any topics that are of interest to the user can be specified for their contents to be combined and included in PWP 11.

Examples of the information topics include prices of certain mutual funds, weather information of a particular city, NBA scores of a particular team, daily news about a specific topic, and top ten best-selling audio compact disks.

Referring to FIGS. 2A, 2B, 2C, and 2D, four different examples are illustrated in Examples 2.1, 2.2, 2.3, and 2.4. The content of each of the examples can be included or combined in a user input to generate a PWP 11 that contains specified information. Each of the examples includes a URL 21 of a web site that provides the specified information; an update frequency 22 that establishes a frequency at which PWP 11 is updated; a user's annotation 23 that outlines the topic of the information with a collection of keywords, key phrases, or a short summary of the information; and an information object 24, which contains a sample of the specified information. To generate information object 24, a user can copy any portion of a web page of interest and paste it in the input. Information object 24 includes an object text 26, which is the main body of the specified information. Information object 24 can also include an object title 25 that is a descriptive heading of object text 26. Exemplary object titles 25 are shown in Examples 2.1 and 2.2, in which the object titles are "Application Service Provider" and "TOP STORIES," respectively.

System 10 derives information from the input for updating PWP 11. Specifically, system 10 derives WebScript Transcript Information (WTI) from information object 24 and user's annotation 23. The WTI includes information components that characterize the information of interest. The WTI will be described in detail below with reference to FIG. 3.

System 10 stores the WTI in a WTI store 320. When any portion of PWP 11 requires an update, system 10 retrieves the WTI corresponding to that portion from WTI store 320. From the WTI, system 10 identifies current content of interest in a web page after the content is updated by the hosting web site. System 10 extracts the current content at the specified update frequency 22, and updates the corresponding portion of PWP 11 by replacing the corresponding portion with the current content of interest.

Figure 3:
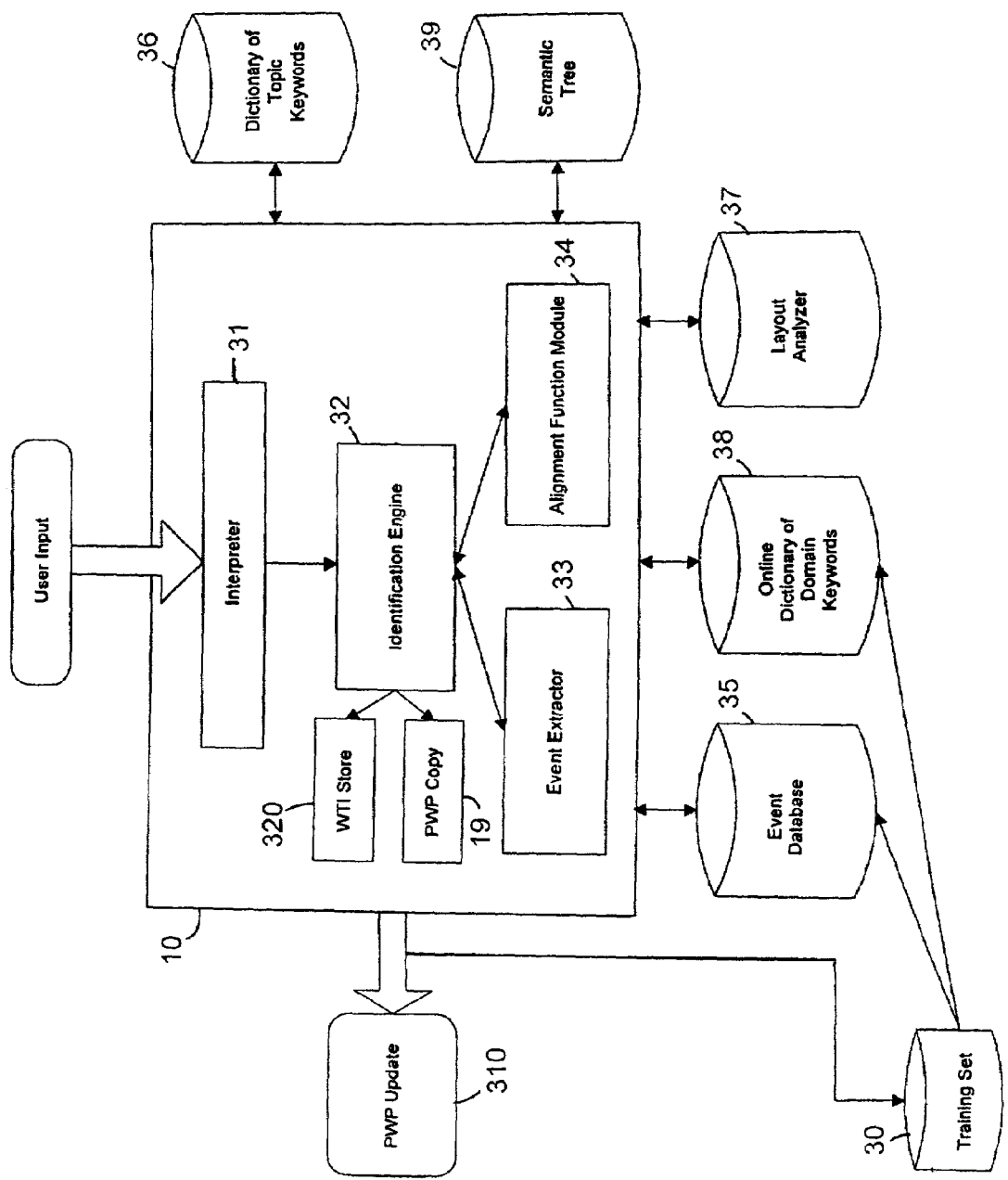
FIG. 3 is a system diagram of the WebScript transcribed system.

Referring to FIG. 3, system 10 includes an interpreter 31 that processes an input and converts the input to a web page format, e.g., XML or HTML. System 10 also includes an identification engine 32, which executes an identification algorithm for extracting the WTI from the converted format. The information components of the WTI include topic keywords, which describe the nature or the central idea of information object 24; layouts, which includes positional information of information object 24; domain keywords, which indicate the types or the domains of applications for information object 24; semantic categories, which indicates the categories of words or phrases in information object 24; and events, which capture the meaning of the user's annotation 23 and object text 26. Each of the information components of the WTI will be described in detail below.

The topic keywords can be found either in user's annotation 23 or in object title 25 of information object 24. Examples of topic keywords include the "meaning of" in Example 2.1, and the "TOP STORIES" in Example 2.2. Even without checking through the remaining information, these keywords alone are representative of the whole information object. System 10 recognizes the topic keywords by interacting with a dictionary of topic keywords 36, which is a database that contains the meaning for each given topic keyword.

The layout of information object 24 provides the position and boundary of information object 24. The layout does not convey the meaning of information object 24; rather, the layout contains the format or the arrangement of the information object. For example, the layout of a paragraph of text includes the HTML tags in the paragraph and the positions of the tags relative to the domain keywords. The layout of an HTML table, on the other hand, includes the HTML tags and the dimensions of the table. If the layout has a homogenous style, such as the layout of object text 26b in Example 2.2 of FIG. 2B, the task of identifying the layout and updating information object 24 will be greatly simplified.

Identification engine 32 obtains the layout by consulting a layout analyzer 37, which performs techniques for identifying the layout. The layout identifying techniques have been described, for example, by Wang et al, in "Semantic Search on Internet Tabular Information Extraction for Answering Queries," *Proceedings of the Ninth International Conference on Information and Knowledge Management*, Washington D.C., 2000.

If identification engine 32 identifies any topic keywords in the input, it will update PWP 11 using only the topic keywords and the layout of information object 24. In the next update, identification engine 32 will select a candidate portion of the specified web page, which has a layout consistent with the layout of information object 24. Identification engine 32 will then compare the similarities or relevancy of the candidate to the information object according to the layout and the topic keywords, and assigns a score based on the result of the comparison. System 10 will compare the score with a pre-determined threshold to determine whether additional or alternative information from the user is required.

If identification engine 32 cannot find a topic keyword from the input, it will try to identify domain keywords from information object 24. Domain keywords are the words that pertain to certain types or domains of applications. For example, "temperature", "forecast", "humidity", "wind" are the words that are often used in weather forecast. System 10 interacts with an online dictionary of domain keywords 38, which is a software application that provides a corresponding domain for each given domain keyword. Techniques for identifying the domain keywords have been described by Gusfield, in *Algorithms on Strings, Trees, and Sequences,* Cambridge University Press.

Identification engine 32 can also extract information about information object 24 from categorizing the semantics of certain words or phrases in the information object. In Example 2.3, the days of the week: Sat., Sun., Mon., Tues., and Wed., and the types of the weather: cloudy, sunny, and rainy (not shown), represent two semantic categories. The semantic categories are derived from a semantic tree 39, which includes a large collection of categories of words that have similar or identical meanings.

Based on the domain keywords and the semantic categories, identification engine 32 can locate, sometimes more than one, candidate portion of the specified web page for update. When there is more than one candidate, or when domain keywords and the semantic categories do not provide sufficient information for selecting an update, events in user's annotation 23 or object text 26 can be extracted to determine an update. Events are best used when user's annotation 23 or object text 26 contains text in natural language. System 10 includes a knowledge-based event extractor 33 that can extract events automatically from user's annotation 23 and object text 26. Each event has a frame that could consist of a central verb together with several nouns playing different roles. Alternatively, an event could be a noun phrase. After events are identified and extracted in the form of event frames, event extractor 33 matches the sentences in user's annotation 23 and object text 26 with the events in an event database 35. Event database 35 is a large collection of pre-computed events derived through extensive semantic analysis on widely-circulated publications and literatures Descriptions of events and event extractor 33 can be found in the co-pending U.S. patent application Ser. No. 09/604,385.

An example of the WTI for the input shown in Example 2.1 of FIG. 2A is as follows.

Topic keywords: meaning

Layouts: a title and one HTML paragraph

Domain keywords: subscription service, ASP, host, application, pay-per-use, and information technology Semantic categories: subscription service (service); information technology (technology).

Events:

1. From user's annotation 23: (ASP, meaning);
2. From object text 26: (company, offer, service), (ASP, host, application), (enable, company), (take advantage of, information technology)

In the above example, an event includes words or phrases extracted from a sentence. As shown above, each word or phrase is separated by a comma from the adjacent word or phase, and the words or phrases that belong to the same event are grouped together with a parenthesis. After all the events are extracted, identification engine 32 attaches a tag to each sentence from which an event is extracted. If event extractor 32 extracts more than one event from a sentence, the event extractor will assign one tag for each extracted event to the sentence. If the tags represent mutually exclusive events, identification engine 32 will preserve these events and report them to the user. The user can select the event that is the most relevant to the information of interest.

To locate the best candidate for update in the specified web page, identification engine 32 employs an alignment function module 34, which also resides in system 10, to align or match the extracted events with the candidate portion of the web page. Alignment function module 34 first generates a list LO that includes all the events extracted from the input in the order of their occurrences. Similarly, alignment function module 34 generates another list LW that includes all the events extracted from the candidate portion of the web page in the order of their occurrences. Subsequently, alignment function module 34 finds the best alignment, called LO', of the sequence LO against the sequence LW. The alignment depends on both the syntactic and semantic constraints stipulated in the event frame.

A basic alignment algorithm is described, for example, by Gustfield in *Algorithms on Strings, Trees, and Sequences,* Cambridge University Press.

Once alignment function module 34 determines a best alignment LO', identification engine 32 further compares the layout of the candidate, as well as the domain keywords and semantic categories to determine a best match with information object 24. The comparison is performed using a fuzzy alignment algorithm, which does not require an exact match between the words being compared, but rather generates a score that indicates the candidate's similarity or relevancy to user's annotation 23 and object text 26. System 10 will then compare the score with a pre-determined threshold to determine whether additional or alternative information from the user is required.

Identification engine 32 generates a score based on the comparison of either the topic keywords and the layout, or the domain keywords, the semantic categories, the events, and the layout. If the score exceeds the pre-determined threshold, system 10 generates a PWP update 310, which includes the portion of the web page that is highly relevant or similar to information object 24. System 10 sends PWP update 310 to the user for displaying on client machine 13, and stores a copy 19 of PWP update 310 locally in the system. The portion of the web page is also added to a training set 30. Training set 30 stores a list for the updates of each information object submitted to system 10. When PWP 11 requires an update again for the portion corresponding to information object 24, system 10 will learn from the corresponding list in training set 30 by incorporating the WTI of past updates into the current update. For example, if certain domain keywords or events exist in both the WTI of information object 24 and any of the past updates, these domain keywords or events will be given a higher score in the comparison. A machine learning technique for learning from the training set has been described, for example, by T. Mitchell., "Machine Learning". McGraw Hill, New York, 1997.

Figure 4:
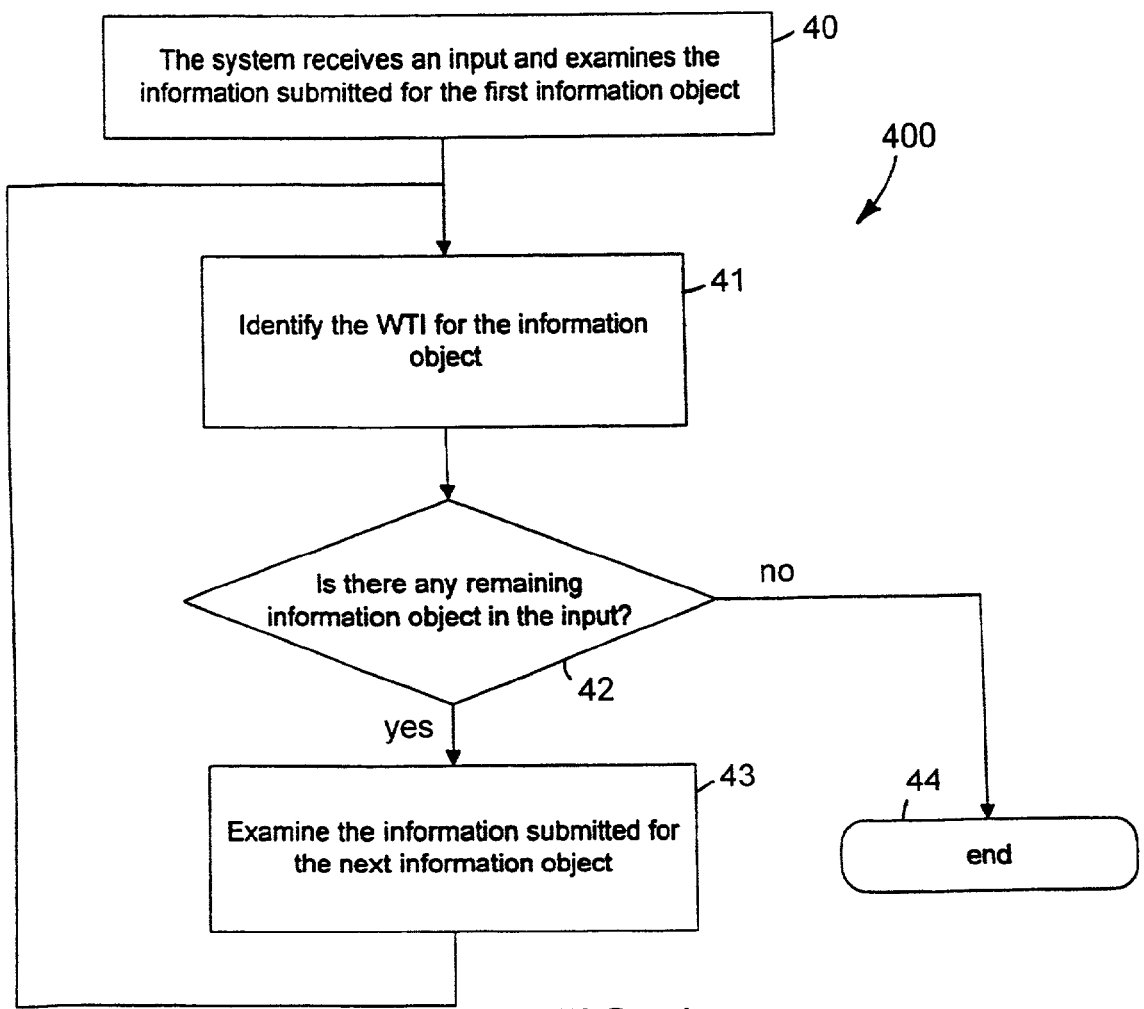
FIG. 4 illustrates a process for generating WebScript Transcribed Information (WTI) derived from the user inputs.

Referring to FIG. 4, a process 400 is shown for generating the WTI for an input. System 10 receives the input and examines the information submitted for the first information object 24 (box 40). Identification engine 32 extracts the WTI for the information object 24 from the submitted information (box 41). System 10 then determines if there is any remaining information object 24 in the input (box 42). If there is at least one remaining information object 24, system 10 repeats the operations of boxes 41 and 42 until all the information objects 24 in the input are examined (box 43). Otherwise, system 10 completes process 400 (box 44).

Figure 5:
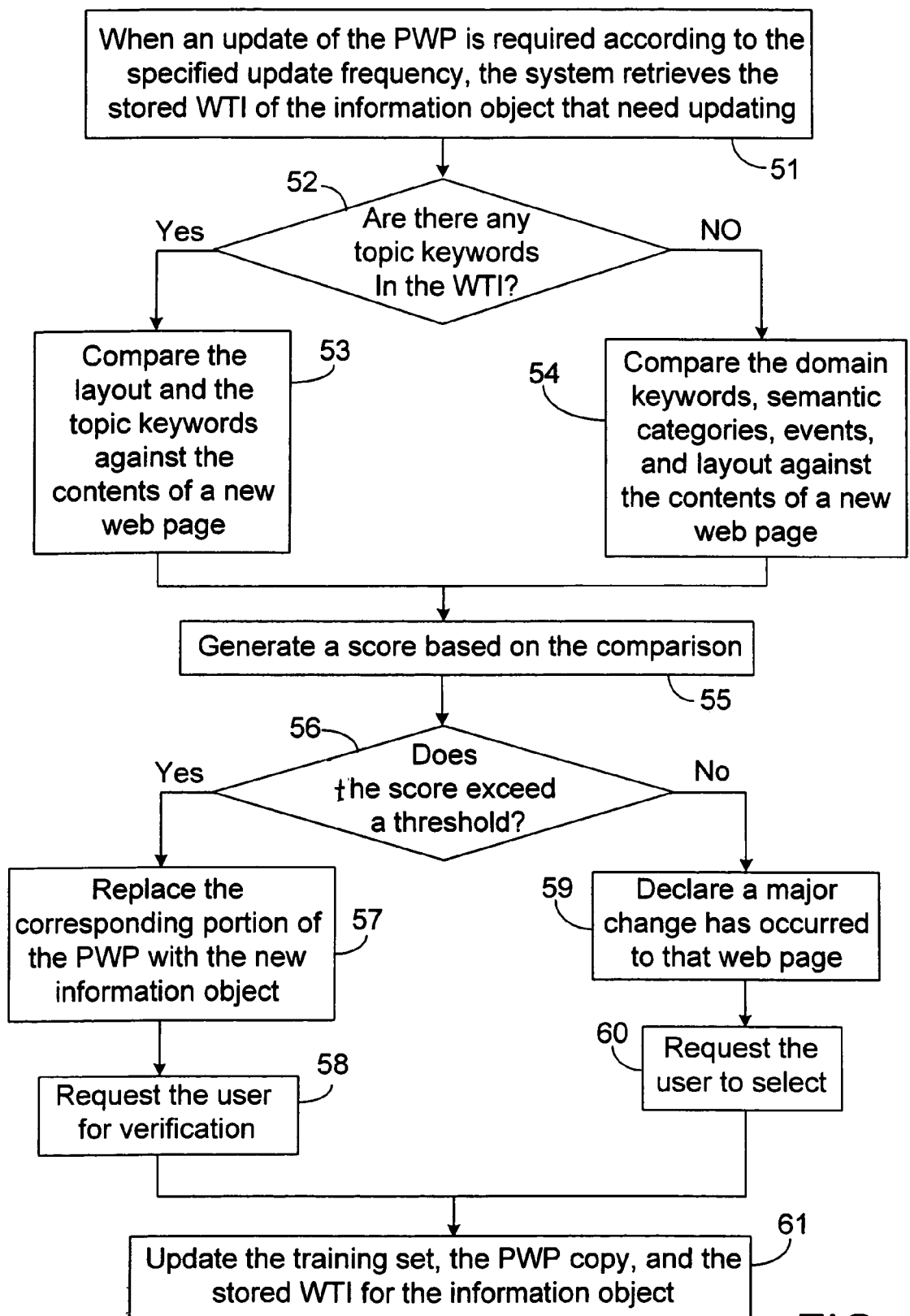
FIG. 5 is a flow diagram that illustrates a process of updating a Personalized Web Page (PWP) performed by the WebScript transcribed system.

Referring to FIG. 5, an updating process 410 for updating an information object 24 in a PWP 11 is described. When an update of PWP 11 is required according to the corresponding update frequency, system 10 retrieves the stored WTI for the information object 24 that needs updating (box 51). System 10 determines whether any topic keyword has been identified for the information object 24 (box 52). If there is at least one, then the content of object text 26 will be ignored, and only the layout and the topic keyword will be used to compare with the content of a new web page (box 53). If no topic keyword is found, system 10 will use the domain keywords, the semantic categories, the events, and the layout in the WTI to compare with the content of the new web page (box 54).

Based on the comparison, system 10 generates a score (box 55), and determines whether the score exceeds a pre-determined threshold (box 56). If the score exceeds the threshold, system 10 replaces the information object with the content of the new web page (box 57), and requests the user to verify the replacement or update (box 58). If the score is below the threshold, system 10 will declare that a major change has occurred to that web page (box 59). One possible reason for the major change to have occurred, for example, is that the desired information content has been removed from the web site that is specified by the URL. System 10 will then ask the user to reselect an input containing additional or alternative information (box 60).

After the user verifies that system 10 has generated a correct update, or the user has reselected an input, system 10 will add the update or the input into training set 30 for later updates (box 61).

Accordingly, other embodiments are within the scope of the following claims.

What is claimed is:

1. A method comprising:
    identifying characteristic features of a web site from an input that includes an identifier and an information sample, the input identifying the web site, the information sample being obtained from the web site during a first time period;
    during a second time period after the first time period, determining relevancy of contents of the web site at the second time period to the information sample based on the identified characteristic features;
    extracting at least a portion of the contents from the web site based on the relevancy of the portion of contents to the information sample; and
    updating a personalized web page with the extracted contents.

2. The method of claim 1 further comprising repeating the determining relevancy, extracting, and updating at a frequency specified by the input.

3. The method of claim 2 further comprising:
    requesting a verification after updating the personalized web page;
    if the verification confirms the update, adding the contents into a training set; and
    locating the contents of the web site based on the training set during the extracting and updating.

4. The method of claim 1 wherein identifying characteristic features include identifying a topic keyword.

5. The method of claim 1 wherein identifying the characteristic features include identifying a layout of the information sample.

6. The method of claim 1 wherein identifying the characteristic features includes identifying domain keywords in the information sample.

7. The method of claim 1 wherein identifying the characteristic features includes identifying semantic categories of keywords in the information sample.

8. The method of claim 1 wherein identifying the characteristic features includes identifying events in the input.

9. The method of claim 1, further comprising
    assigning a score according to degree of the relevancy of the contents to the information sample; and
    requesting a different input if the score is below a predetermined threshold.

10. The method of claim 1 in which identifying characteristic features of the web site comprises using a computer to automatically identify characteristic features of the web site.

11. The method of claim 10 in which the computer automatically identifies characteristic features of the information sample.

12. A system comprising:
    a processor to:
        identify characteristic features of a web site from an input that includes an identifier and an information sample, the input identifying, the information sample being obtained from the web site during a first time period;
        during a second time period after the first time period, determine relevancy of contents of the web site at the second time period with the information sample based on the identified characteristic features;
        extract at least a portion of the contents from the web site based on the relevancy of portion of the contents to the information sample; and
        update a personalized web page with the extracted contents; and
    a display to display the personalized web page.

13. The system of claim 12 wherein the processor is constructed and arranged to repeatedly determine relevancy, extract, and update at a frequency specified by the input.

14. The system of claim 12 wherein the processor is constructed and arranged to:
- request a verification after updating the personalized web page;
- if the verification confirms the update, adds the contents into a training set; and
- locate the corresponding contents of the web site based on the training set during extracting and updating.

15. The system of claim 12 further comprising a topic database to allow the processor to identify a topic keyword as one of the characteristic features.

16. The system of claim 12 further comprising a layout analyzer to allow the processor to identify a layout as one of the characteristic features.

17. The system of claim 12 further comprising an online domain database to allow the processor to identify domain keywords as one of the characteristic features.

18. The system of claim 12 further comprising a semantic tree to allow the processor to identify semantic categories of keywords as part of the characteristic features.

19. The system of claim 12 further comprising an event database to allow the processor to identify events as some of the characteristic features.

20. The system of claim 12 wherein the processor is constructed and arranged to:
- assign a score based on degree of the relevancy of the contents to the information sample; and
- request a different input if the score is below a predetermined threshold.

21. A computer program product residing on a computer readable medium comprising instructions for causing a computer to:
- identify characteristic features of a web site from an input that includes an identifier and an information sample, the input identifying the web site, the information sample being obtained from the web site during a first time period;
- during a second time period after the first time period, determining relevancy of contents of the web site at the second time period to the information sample based on the identified characteristic features;
- extract at least a portion of the contents from the web site based on relevancy of the portion of contents to the information sample; and
- update a personalized web page with the extracted contents.

22. The computer program product of claim 21 comprising instructions for causing the computer to repeatedly determine relevancy, identify and update at a frequency specified by the input.

23. The computer program product of claim 21 comprising instructions for causing the computer to:
- request a verification after updating the personalized web page;
- if the verification confirms the update, add the contents into a training set; and
- locate the contents of the web site based on the training set when extracting the contents and updating the personalized web page.

24. The computer program product of claim 21 wherein the characteristic features include at least one of a topic keyword, a layout, domain keywords, semantic categories of keywords, and events.

25. The computer program product of claim 21 comprising instructions for causing the computer to:
- assign a score based on degree of the relevancy of the contents to the information sample; and
- request a different input if the score is below a predetermined threshold.

26. The computer program product of claim 25 comprising instructions for causing the computer to:
- compare a topic keyword and a layout of corresponding contents with those of the information sample to determine the degree of relevancy.

27. The computer program product of claim 25 comprising instructions for causing the computer to:
- compare at least one of domain keywords, semantic categories of keywords, events, and a layout of the contents with those of the information sample to determine the degree of relevancy.

* * * * *